Patented May 31, 1949

2,471,870

UNITED STATES PATENT OFFICE 2,471,870

OIL-RESISTANT COMPOSITION

Philip T. Gidley, Fairhaven, Mass., assignor, by mesne assignments, to Standard Oil Development Company, a corporation of Delaware No Drawing. Application November 10, 1944, Serial No. 562,905

4 Claims. (Cl. 260—28.5)

This invention relates to a new composition of matter resistant to the deteriorating factors of oils, weather, ozone, electrical charges, and temperature changes. More particularly, this invention relates to an oil resistant hose or hose cover which is also resistant to sunlight.

An object of this invention is to produce a new oil resistant composition not subject to cracking in direct sunlight. Another object is a weather resistant composition not limited in application by a tendency to cold flow. A further object is an oil and sunlight resistant elastic substance which is serviceable at low temperatures. Still another object is a new gasoline resistant hose with excellent resistance to abrasion and outdoor exposure. Yet another object is a versatile new composition resistant to high voltage, oil, water, sunlight, and extreme temperatures. Another object is to advance the art. Other objects will appear hereinafter.

My invention is essentially a composition consisting of a mixture predominantly of a copolymer of butadiene acrylonitrile and a polyvinyl acetal. Any copolymer of butadiene and acrylic acid nitrile may be employed. However, I prefer a copolymer consisting of 74 parts of butadiene and 26 parts of acrylic acid nitrile (known commercially as Perbunan).

Any polyvinyl acetal may be employed, but I prefer polyvinyl formal. The polyvinyl acetal may be produced by any known means. For example, polyvinyl alcohol may be reacted with an aldehyde in the presence of a catalyst such as a mineral acid. Or the polyvinyl acetal may be produced according to the method of British-Thompson-Houston Company, Limited, British Patent 518,006 in 1936.

This method and others produce polyvinyl acetal from polyvinyl acetate. The probable formula of polyvinyl acetals is:

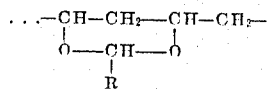

in which R represents hydrogen, an organic group, or an alkyl group.

My new compositions are formed by intimately associating the butadiene acrylic acid nitrile and the polyvinyl acetal as on conventional rubber mill rolls or in a Banbury mixer.

The following examples will serve to illustrate my invention.

EXAMPLE 1

The following recipe was prepared in two parts:

Part A

| | Parts |
|---|---|
| Butadiene acrylonitrile (74:26) | 100 |
| Zinc oxide | 10 |
| Sulfur | 2 |
| Phenyl alpha naphthylamine | 0.5 |
| Petroleum wax | 1 |
| Channel black | 60 |
| Dibutyl phthalate | 10 |
| Benzothiazyldisulfide | 1.5 |
| Tricresyl phosphate | 10 |

Part B

| | Parts |
|---|---|
| Polyvinyl formal (161° centigrade softening point) | 100 |
| Tricresyl phosphate | 35 |
| Dibutyl phthalate | 15 |
| Benzyl benzoate | 5 |
| Clay | 12 |

The above two parts were mixed separately on conventional rubber mill rolls until each part was thoroughly mixed. Part B was mixed on hot mill. Part B was then added to Part A and the two parts thoroughly blended. This method is intended to be illustrative and not limitative—any suitable means of blending may be used.

The composition cure was under pressure for 60 minutes at 315° Fahrenheit. The vulcanizate was then subjected to standard rubber tests with results as illustrated in Table 1.

Table 1

| | |
|---|---|
| Tensile strength | 3880 lbs. per sq. in. |
| Ultimate elongation | 480% |
| Low temperature flexibility (90° bend) | −70° F. |
| Water absorption (1 week at 70° F.) | 0.9% |
| Sunlight resistance | Excellent |
| Mineral oil resistance | Excellent |
| Vegetable oil resistance | Excellent |
| Flame resistance | Good |

EXAMPLE 2

The following recipes were used in this example:

Part A

| | Parts |
|---|---|
| Butadiene acrylic acid nitrile copolymer | 100 |
| Zinc oxide | 10 |
| Clay (fine particle) | 75 |
| Tricresyl phosphate | 10 |
| Paraffin | 2 |
| Benzothiazyl disulfide | 1.5 |
| Sulfur | 2 |
| Phenyl beta naphthylamine | 1.5 |
| Sym. di-beta-naphthyl-para-phenylene diamine | 0.5 |

Part B

| | Parts |
|---|---|
| Polyvinyl formal (206° centigrade softening point) | 100 |
| Clay (fine particle) | 20 |
| Tricresyl phospate | 40 |

The two parts were mixed separately and blended in the same manner indicated in Example 1. The total composition was then cured 75 minutes at 290° Fahrenheit. The test results are indicated in Table 2.

Table 2

| | |
|---|---|
| Tensile strength | 2180 lbs. per sq. in. |
| Elogation | 510% |
| Oil resistance | Excellent |
| Flame resistance | Good |
| Vegetable oil resistance | Excellent |
| Electrical resistance | Excellent |

Instead of polyvinyl formal, polyvinyl butyral or polyvinyl acetal may be employed with good results. Small amounts of other polyvinyl resins (such as polyvinyl alcohol and/or polyvinyl acetate), physically mixed with the polyvinyl acetal, will improve processing and blending with the butadiene acrylonitrile copolymer.

It is obvious to those skilled in the art that various formula and procedure modifications may be employed within the scope of this invention.

I claim:

1. As a new composition of matter a curable mixture consisting of: 100 parts of a rubbery butadiene acrylonitrile copolymer, 100 parts of a resin selected from the group consisting of polyvinyl formal, polyvinyl acetal and polyvinyl butyral; about 10 parts of zinc oxide; about 2 parts of sulfur; about 45 to 50 parts of tricresyl phosphate; about 1.5 parts of a vulcanization accelerator; about 72-95 parts of a filler and 0.5 to 2 parts of anti-oxidant.

2. A vulcanized rubbery composition having improved resistance to sunlight and oils, said composition consisting of: 100 parts of a rubbery butadiene-acrylonitrile copolymer mixed and blended with a substantially equal amount of polyvinyl formal resin having a softening point of about 161° C., 10 parts of zinc oxide; 2 parts of sulfur; 1.5 parts of benzothiazyl disulfide; .5 part of phenyl alpha naphthylamine; 1 part of petroleum wax; 60 parts of channel black; 12 parts of clay; 25 parts of dibutyl phthalate; 45 parts of tricresyl phosphate and 5 parts of benzyl benzoate.

3. A method for preparing compositions of improved resistance to sunlight and oils, said method consisting of mechanically mixing 100 parts of a rubbery butadiene-acrylonitrile copolymer, 10 parts of zinc oxide, 2 parts of sulfur, .5 part of phenyl alpha naphthylamine, 1 part of petroleum wax, 60 parts of channel black, 10 parts of dibutyl phthalate, 1.5 parts of benzothiazyl disulfide and 10 parts of tricresyl phosphate to form a mixture; in a separate step mechanically mixing 100 parts of polyvinyl formal having a softening point about 161° C., 35 parts of tricresyl phosphate, 15 parts of dibutyl phthalate, 5 parts of zenzyl benzoate and 12 parts of clay to form another mixture; thoroughly blending the said two mixtures, and vulcanizing the resulting blend at about 315° F.

4. The method of preparing compositions of improved resistance to sunlight and oils, the method consisting of mechanically mixing 100 parts of a rubbery butadiene-acrylonitrile copolymer, about 10 parts of zinc oxide, about 75 parts of clay, about 10 parts of tricresyl phosphate, about 1.5 parts of a vulcanization accelerator, about 2 parts of sulfur, and about 2 parts of an organic amine anti-oxidant to form a mixture; in a separate step mixing mechanically 100 parts of polyvinyl formal, 20 parts of clay and 40 parts of tricresyl phosphate to form another mixture; thoroughly blending the said two mixtures, and vulcanizing the resulting blend.

PHILIP T. GIDLEY.

REFERENCES CITED

The following references are of record in the file of this patent:

UNITED STATES PATENTS

| Number | Name | Date |
|---|---|---|
| 2,194,350 | Berg | Mar. 19, 1940 |
| 2,267,530 | Maclachlan | Dec. 23, 1941 |
| 2,330,353 | Henderson | Sept. 28, 1943 |
| 2,362,961 | Welch | Nov. 14, 1944 |
| 2,376,854 | Saunders et al. | May 22, 1945 |
| 2,383,789 | Harvey | Aug. 28, 1945 |
| 2,392,589 | Harvey | Jan. 8, 1946 |
| 2,412,216 | Harvey | Dec. 10, 1946 |

FOREIGN PATENTS

| Number | Country | Date |
|---|---|---|
| 405,986 | Great Britain | Feb. 12, 1934 |